(12) United States Patent
Park et al.

(10) Patent No.: US 10,777,356 B2
(45) Date of Patent: *Sep. 15, 2020

(54) ELECTRONIC COMPONENT

(71) Applicant: SAMSUNG ELECTRO-MECHANICS CO., LTD., Suwon-si, Gyeonggi-do (KR)

(72) Inventors: Heung Kil Park, Suwon-si (KR); Se Hun Park, Suwon-si (KR); Gu Won Ji, Suwon-si (KR); Young Ghyu Ahn, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 20 days.

This patent is subject to a terminal disclaimer.

(21) Appl. No.: 16/207,047

(22) Filed: Nov. 30, 2018

(65) Prior Publication Data

US 2019/0326059 A1   Oct. 24, 2019

(30) Foreign Application Priority Data

Apr. 20, 2018   (KR) .................. 10-2018-0046157

(51) Int. Cl.
| | |
|---|---|
| *H01G 4/248* | (2006.01) |
| *H01G 4/232* | (2006.01) |
| *H01G 4/30* | (2006.01) |
| *H01G 4/008* | (2006.01) |
| *H01G 4/12* | (2006.01) |

(52) U.S. Cl.
CPC ........... *H01G 4/248* (2013.01); *H01G 4/2325* (2013.01); *H01G 4/30* (2013.01); *H01G 4/008* (2013.01); *H01G 4/1227* (2013.01)

(58) Field of Classification Search
CPC ........ H01G 4/245; H01G 4/2325; H01G 4/30; H01G 4/008; H01G 4/1227
See application file for complete search history.

(56) References Cited

U.S. PATENT DOCUMENTS

| 8,988,853 | B2 * | 3/2015 | Kim .................... | H01G 4/228 |
| | | | | 361/301.4 |
| 9,558,890 | B2 * | 1/2017 | Hattori ................ | H01G 4/308 |
| 10,128,050 | B1 * | 11/2018 | Park .................... | H01G 4/005 |
| 10,192,686 | B1 * | 1/2019 | Park .................... | H01G 4/30 |
| 10,325,722 | B2 * | 6/2019 | Park .................... | H01G 4/248 |
| 10,453,616 | B2 * | 10/2019 | Park .................... | H01G 4/005 |

(Continued)

FOREIGN PATENT DOCUMENTS

| JP | 2012-204572 A | 10/2012 |
| JP | 2014-042037 A | 3/2014 |

*Primary Examiner* — Dion Ferguson
(74) *Attorney, Agent, or Firm* — Morgan, Lewis & Bockius LLP (57) ABSTRACT

An electronic component includes: a capacitor body; first and second external electrodes disposed on a mounting surface of the capacitor body to be spaced apart from each other; and first and second connection terminals including an insulator, electrically connected to the first and second external electrodes, respectively, through land patterns each disposed on upper and lower surfaces thereof and electrically connected to each other, and having first and second bridge portions protruding so as to face each other in the length direction of the capacitor body, respectively.

13 Claims, 6 Drawing Sheets

(56) References Cited

U.S. PATENT DOCUMENTS

| | | | |
|---|---|---|---|
| 10,483,040 B1* | 11/2019 | Kim | H01G 4/232 |
| 2014/0016242 A1 | 1/2014 | Hattori et al. | |
| 2015/0041195 A1* | 2/2015 | Ahn | H01G 2/065 |
| | | | 174/260 |
| 2015/0122534 A1* | 5/2015 | Park | H01G 4/228 |
| | | | 174/260 |
| 2015/0131253 A1* | 5/2015 | Park | H01G 4/236 |
| | | | 361/782 |
| 2015/0206661 A1* | 7/2015 | Fujimura | H01G 4/30 |
| | | | 361/301.4 |
| 2015/0223334 A1* | 8/2015 | Nakagawa | H05K 3/3442 |
| | | | 174/258 |
| 2015/0310991 A1* | 10/2015 | Ning | H01G 4/30 |
| | | | 361/301.4 |
| 2016/0042869 A1* | 2/2016 | Park | H01G 2/06 |
| | | | 174/260 |
| 2017/0171980 A1* | 6/2017 | Hattori | H01G 4/228 |
| 2017/0358397 A1* | 12/2017 | McConnell | B23K 20/002 |
| 2018/0323010 A1* | 11/2018 | Park | H05K 3/3442 |
| 2019/0096585 A1* | 3/2019 | Park | H01G 4/248 |
| 2019/0252121 A1* | 8/2019 | Park | H01G 4/30 |
| 2019/0259539 A1* | 8/2019 | Kim | H01G 4/30 |
| 2019/0326060 A1* | 10/2019 | Park | H01G 4/30 |
| 2019/0341189 A1* | 11/2019 | Park | H01G 4/2325 |

* cited by examiner

ELECTRONIC COMPONENT

CROSS-REFERENCE TO RELATED APPLICATION(S)

This application claims the benefit of priority to Korean Patent Application No. 10-2018-0046157 filed on Apr. 20, 2018 in the Korean Intellectual Property Office, the disclosure of which is incorporated herein by reference in its entirety.

BACKGROUND

1. Field

The present disclosure relates to an electronic component.

2. Description of Related Art

In recent electronic devices, as attempts to reduce the noise of equipment components has been ongoing, acoustic noise generated in a multilayer ceramic capacitor (MLCC) may become more prominent.

Since a dielectric material of a multilayer capacitor has piezoelectric properties, the multilayer ceramic capacitor may be synchronized with an applied voltage to thereby be deformed.

When a period of the applied voltage is within an audio frequency band, the displacement may become vibrations to thereby be transferred to a board through solders, and vibrations of the board may be experienced as sound. This sound, known as acoustic noise, is a problem in electronic devices.

The acoustic noise problem is that when an operating environment of a device is quiet, a user may experience acoustic noise as abnormal noise and may believe that a device is faulty, or when acoustic noise overlaps an audio output in a device having an audio circuit, quality of the device may be deteriorated.

Further, separately from acoustic noise recognized by the human ear, when piezoelectric vibrations of the multilayer capacitor are generated in a high frequency region of 20 kHz or more, the piezoelectric vibrations may cause malfunctioning of various sensors used in information technology (IT) and industrial/electric fields.

SUMMARY

An aspect of the present disclosure may provide an electronic component capable of decreasing acoustic noise in an audio frequency region of 20 kHz or less and high frequency vibrations of 20 kHz or more.

According to an aspect of the present disclosure, an electronic component may include: a capacitor body; first and second external electrodes disposed on a mounting surface of the capacitor body to be spaced apart from each other; and first and second connection terminals formed of an insulator, connected to the first and second external electrodes, respectively, through land patterns respectively formed on upper and lower surfaces thereof and electrically connected to each other, and having first and second bridge portions protruding so as to face each other in the length direction of the capacitor body, respectively.

The first connection terminal may include a first land pattern formed on a surface of the first connection terminal facing the first external electrode, a second land pattern formed on a surface thereof opposing the first land pattern, and a first conductive pattern formed on at least a portion of a surface thereof connecting the first and second land patterns to each other and electrically connecting the first and second land patterns to each other, and the second connection terminal may include a third land pattern formed on a surface of the second connection terminal facing the second external electrode, a fourth land pattern formed on a surface thereof opposing the third land pattern, and a second conductive pattern formed on at least a portion of a surface thereof connecting the third and fourth land patterns to each other and electrically connecting the third and fourth land patterns to each other.

At least one first and second cut portions may be formed in surfaces of the first and second connection terminals opposing each other in the length direction of the capacitor body, respectively.

Cut portions may be further formed in surfaces of the first and second connection terminals in the width direction of the capacitor body.

First and second solder accommodating portions may be provided on the first and second external electrodes toward the mounting surface of the capacitor body by the first and second cut portions, respectively.

The first connection terminal may include a first land pattern formed on a surface of the first connection terminal facing the first external electrode, a second land pattern formed on a surface thereof opposing the first land pattern, the first cut portion formed on a portion of the surface thereof connecting the first and second land patterns to each other, and a first conductive pattern formed on the first cut portion and electrically connecting the first and second land patterns to each other, and the second connection terminal may include a third land pattern formed on a surface of the second connection terminal facing the second external electrode, a fourth land pattern formed on a surface thereof opposing the third land pattern, the second cut portion formed on a portion of the surface thereof connecting the third and fourth land patterns to each other, and a second conductive pattern formed on the second cut portion and electrically connecting the third and fourth land patterns to each other.

The first conductive pattern may be formed on an entire surface of the first connection terminal connecting the first and second land patterns to each other or a portion of the surface including the first cut portion, and the second conductive pattern may be formed on an entire surface of the second connection terminal connecting the third and fourth land patterns to each other or a portion of the surface including the second cut portion.

The electronic component may further include plating layers formed on surfaces of the first and second external electrodes.

The capacitor body may include a plurality of dielectric layers and a plurality of first and second internal electrodes alternately disposed with respective dielectric layers interposed therebetween and has first and second surfaces opposing each other and third and fourth surfaces connected to the first and second surfaces and opposing each other, and one ends of the first and second internal electrodes may be exposed to the third and fourth surfaces of the capacitor body, respectively.

The first and second external electrodes may respectively include: first and second connection portions disposed on the third and fourth surfaces of the capacitor body, respectively, and first and second band portions extended from the first and second connection portions to portions of the first surface of the capacitor body and connected to the first and second connection terminals, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
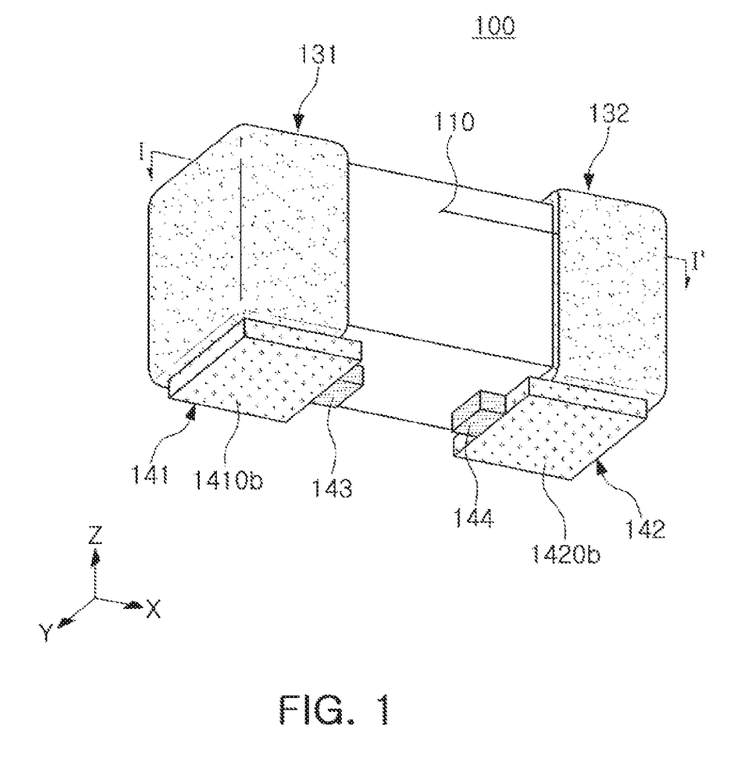
FIG. 1 is a perspective view schematically illustrating an electronic component according to an exemplary embodiment in the present disclosure.
Figure 2:
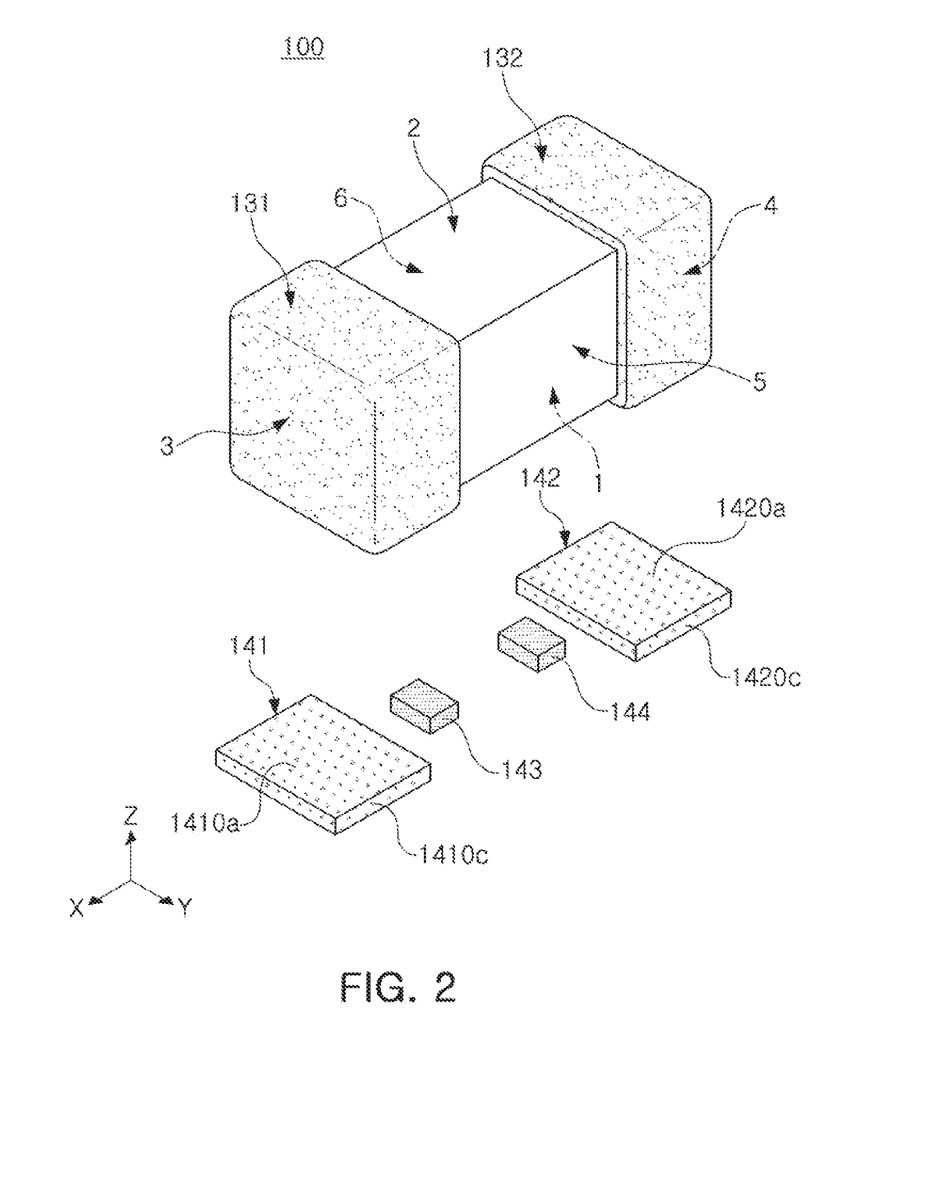
FIG. 2 is an exploded perspective view of FIG. 1.
Figure 3A:
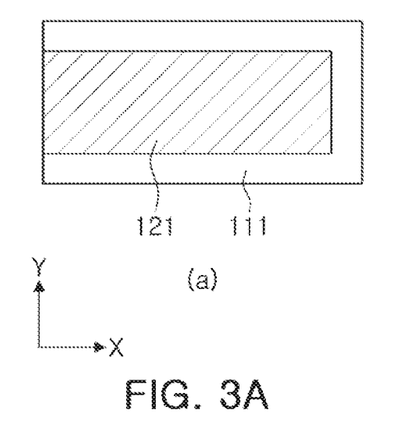
FIGS. 3A and 3B are plan views illustrating first and second internal electrodes of the electronic component according to the exemplary embodiment in the present disclosure, respectively.
Figure 3B:
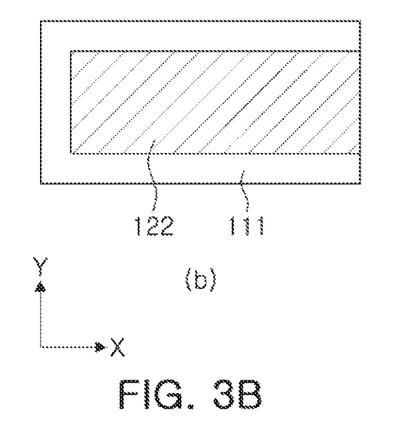
Figure 4:
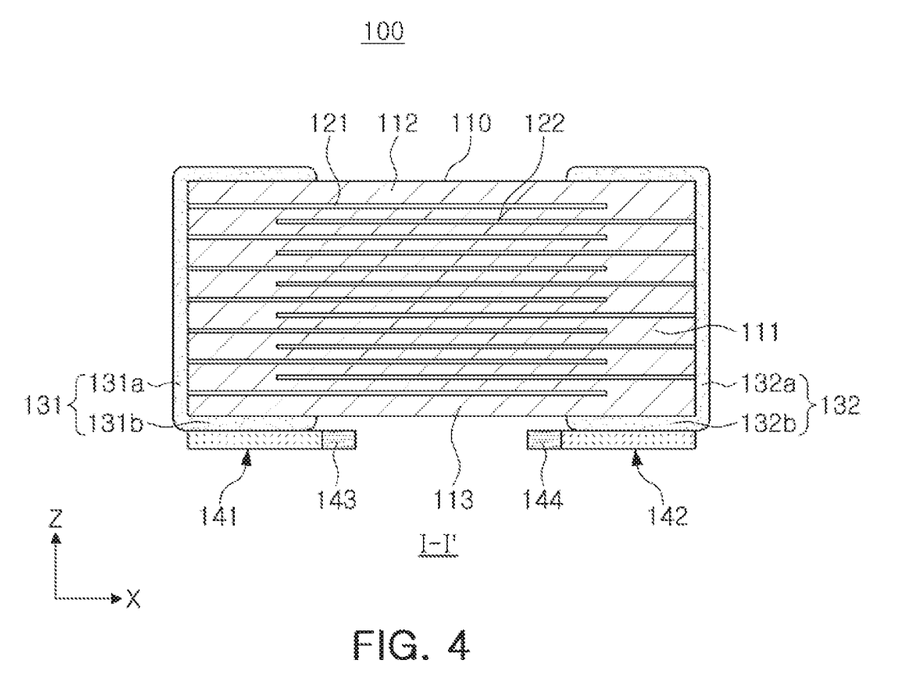
FIG. 4 is a cross-sectional view taken along line I-I' of FIG. 1.

FIG. 1 is a perspective view schematically illustrating an electronic component according to an exemplary embodiment in the present disclosure, FIG. 2 is an exploded perspective view of FIG. 1, FIGS. 3A and 3B are plan views illustrating first and second internal electrodes of the electronic component according to the exemplary embodiment in the present disclosure, respectively, and FIG. 4 is a cross-sectional view taken along line I-I' of FIG. 1.

Referring to FIGS. 1 through 4, an electronic component 100 according to the exemplary embodiment in the present disclosure may include a capacitor body 110, first and second external electrodes 131 and 132 disposed on amounting surface of the capacitor body 110 to be spaced apart from each other, and first and second connection terminals 141 and 142 having first and second bridge portions 143 and 144, respectively.

Hereinafter, directions of a capacitor body 110 will be defined in order to clearly describe exemplary embodiments in the present disclosure. X, Y, and Z illustrated in the accompanying drawings refer to a length direction, a width direction, and a thickness direction of the capacitor body 110, respectively. Here, in the present exemplary embodiment, the thickness direction may be the same as a stacking direction in which dielectric layers are stacked.

The capacitor body 110 may be formed by stacking a plurality of dielectric layers 111 in the Z direction and sintering the stacked dielectric layers, and include the plurality of dielectric layers 111 and first and second internal electrodes 121 and 122 alternately disposed with respective dielectric layers 111 interposed therebetween in the Z direction.

In addition, covers 112 and 113 having a predetermined thickness may be formed on both sides of the capacitor body in the Z direction, respectively.

Here, respective adjacent dielectric layers 111 of the capacitor body 110 may be integrated with each other so that boundaries therebetween are not readily apparent.

The capacitor body 110 may have an approximately hexahedral shape. However, a shape of the capacitor body 110 is not limited thereto.

In the present disclosure, for convenience of explanation, both surfaces of the capacitor body 110 opposing each other in the Z direction may be defined first and second surfaces 1 and 2, both surfaces of the capacitor body 110 connected to the first and second surfaces 1 and 2 and opposing each other in the X direction may be defined as third and fourth surfaces 3 and 4, and both surfaces of the capacitor body 110 connected to the first and second surfaces 1 and 2 and the third and fourth surfaces 3 and 4 and opposing each other in the Y direction may be defined as fifth and sixth surfaces 5 and 6. In the present exemplary embodiment, the first surface 1 of the capacitor body may be the mounting surface.

The dielectric layer 111 may contain a ceramic material having high permittivity, for example, a barium titanate ($BaTiO_3$) based ceramic powder, or the like. However, the material of the dielectric layer is not limited thereto.

In addition, the dielectric layer 111 may further contain a ceramic additive, an organic solvent, a plasticizer, a binder, a dispersant, and the like, in addition to the ceramic powder. As the ceramic additive, for example, a transition metal oxide or carbide, a rare earth element, magnesium (Mg), aluminum (Al), or the like, may be used.

The first and second internal electrodes 121 and 122, which are electrodes applied with different polarities, may be alternately disposed to face each other in the Z direction with respective dielectric layers 111 interposed, and one ends of the first and second internal electrodes 121 and 122 may be exposed to the third and fourth surfaces 3 and 4 of the capacitor body 110, respectively.

Here, the first and second internal electrodes 121 and 122 may be electrically insulated from each other by the dielectric layer 111 disposed therebetween.

End portions of the first and second internal electrodes 121 and 122 alternately exposed to the third and fourth surfaces 3 and 4 of the capacitor body 110 as described above may be electrically connected to first and second external electrodes 131 and 132 disposed on the third and fourth surfaces 3 and 4 of the capacitor body 110 to be described below.

Here, the first and second internal electrodes 121 and 122 may be formed of a conductive metal, for example, a material such as nickel (Ni), a nickel (Ni) alloy, or the like. However, materials of the first and second internal electrodes 121 and 122 are not limited thereto.

According to the configuration as described above, when predetermined voltages are applied to the first and second external electrodes 131 and 132, electric charges may be accumulated between the first and second internal electrodes 121 and 122 facing each other.

Here, capacitance of the electronic component 100 may be in proportion to an overlapping area between the first and second internal electrodes 121 and 122 overlapping each other in the Z direction.

The first and second external electrodes 131 and 132 may be disposed on the first surface 1, the mounting surface, of the capacitor body 110 to be spaced apart from each other, provided with voltages having different polarities, respectively, and electrically connected to the exposed end portions of the first and second internal electrodes 121 and 122, respectively.

If necessary, plating layers may be further formed on surfaces of the first and second external electrodes 131 and 132 as described above.

For example, the first and second external electrodes 131 and 132 may include first and second conductive layers, first and second nickel (Ni) plating layers formed on the first and second conductive layers, and first and second tin (Sn) plating layers formed on the first and second nickel (Ni) plating layers, respectively.

The first external electrode 131 may include a first connection portion 131a and a first band portion 131b.

The first connection portion 131a may be a portion formed on the third surface 3 of the capacitor body 110 and electrically connected to the first internal electrode 121, and the first band portion 131b may be a portion extended from the first connection portion 131a to a portion of the first surface 1, the mounting surface, of the capacitor body 110 to thereby be connected to the first connection terminal 141.

Here, if necessary, the first band portion 131b may be further extended to portions of the second surface 2 and fifth and sixth surfaces 5 and 6 of the capacitor body 110 for the purpose of improving adhesion strength, or the like.

The second external electrode 132 may include a second connection portion 132a and a second band portion 132b.

The second connection portion 132a may be a portion formed on the fourth surface 4 of the capacitor body 110 and electrically connected to the second internal electrode 122, and the second band portion 132b may be a portion extended from the second connection portion 132a to a portion of the first surface 1, the mounting surface, of the capacitor body 110 to thereby be connected to the second connection terminal 142.

Here, if necessary, the second band portion 132b may be further extended to portions of the second surface 2 and fifth and sixth surfaces 5 and 6 of the capacitor body 110 for the purpose of improving adhesion strength, or the like.

In the present exemplary embodiment, the first and second connection terminals 141 and 142 may be disposed to correspond to the first and second band portions 131b and 132b of the first and second external electrodes 131 and 132 formed on the first surface 1 of the capacitor body 110, respectively.

That is, the electronic component 100 is a structure in which a multilayer capacitor is adhered to small board-type first and second connection terminals 141 and 142 positioned to X-Y surfaces of the first and second external electrodes 131 and 132 to be spaced apart from each other, respectively.

The first and second connection terminals 141 and 142 may be formed of an insulator such as FR-4, F-PCB, a ceramic material, or the like.

Further, the first and second connection terminals may each have conductor land patterns 1410 and 1420 electrically connected to each other on upper and lower surfaces thereof so as to be connected to the first and second external electrodes 131 and 132, respectively. The land patterns as described above may serve as a signal terminal and a ground (GND) terminal.

More specifically, the first connection terminal 141 according to the present exemplary embodiment may include a first land pattern 1410a formed on a surface of the first connection terminal 141 facing the first external electrode 131, a second land pattern 1410b formed on a surface thereof opposing the first land pattern, and a first conductive pattern 1410c formed on at least a portion of a surface thereof connecting the first and second land patterns 1410a and 1410b to each other.

Further, the second connection terminal 142 may include a third land pattern 1420a formed on a surface of the second connection terminal 142 facing the second external electrode 132, a fourth land pattern 1420b formed on a surface thereof opposing the third land pattern 1420a, and a second conductive pattern 1420c formed on at least a portion of a surface thereof connecting the third and fourth land patterns 1420a and 1420b to each other.

Therefore, the land patterns 1410a and 1410b on the upper and lower surfaces of the first connection terminal 141 described above may be electrically connected to each other through the first conductive pattern 1410c, and the land patterns 1420a and 1420b on the upper and lower surfaces of the second connection terminal 142 described above may be electrically connected to each other through the second conductive pattern 1420c.

The first and second connection terminals 141 and 142 may have the first and second bridge portions 143 and 144, respectively.

The first and second bridge portions 143 and 144 may be formed of an insulator and protrude so as to face each other in the X direction. The first and second bridge portions 143 and 144 may be formed of an insulator such as FR-4, F-PCB, a ceramic material, or the like. The first and second bridge portions 143 and 144 may have an elasticity.

Here, a conductor pattern or land pattern may be formed on portions of the first and second bridge portions 143 and 144 but is not entirely formed on the first and second bridge portions 143 and 144.

Therefore, the first and second bridge portions 143 and 144 may be formed by easily cutting and separating connection terminals from a base substrate with respect to massive connection terminals having various patterns, thereby significantly decrease a lead time.

A plurality of connection terminals are manufactured on a single base substrate by printing and then separated into individual products to thereby be used. In this case, a bridge portion may be used as a cut portion for separating each of the connection terminals from the base substrate. Therefore, the connection terminal may be rapidly separated from the base substrate, such that an effect of shortening a manufacturing time at the time of manufacturing a final product may be expected.

Further, a width of the first and second bridge portions 143 and 144 in the Y direction may be narrower than that of the first and second connection terminals 141 and 142 in the Y direction.

Therefore, space portions may be provided at both sides of the first and second bridge portions 143 and 144 in the Y direction, and since these space portions may serve as solder accommodating portions in which a solder is accommodated at the time of mounting the electronic component on a board, a height of the solder may be decreased, and thus acoustic noise may be decreased.

Figure 5:
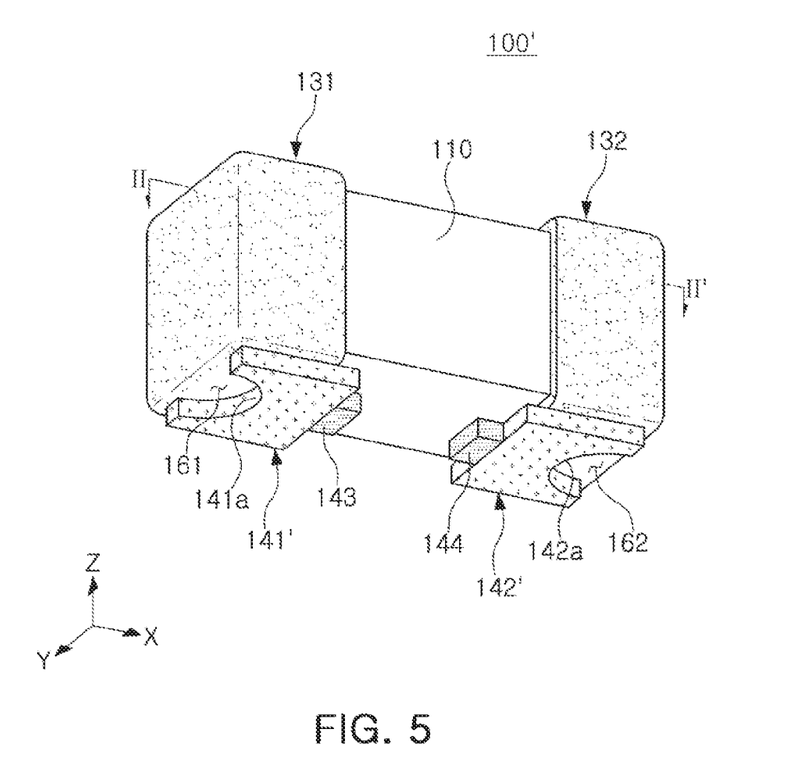
FIG. 5 is a perspective view schematically illustrating an electronic component according to another exemplary embodiment in the present disclosure.
Figure 6:
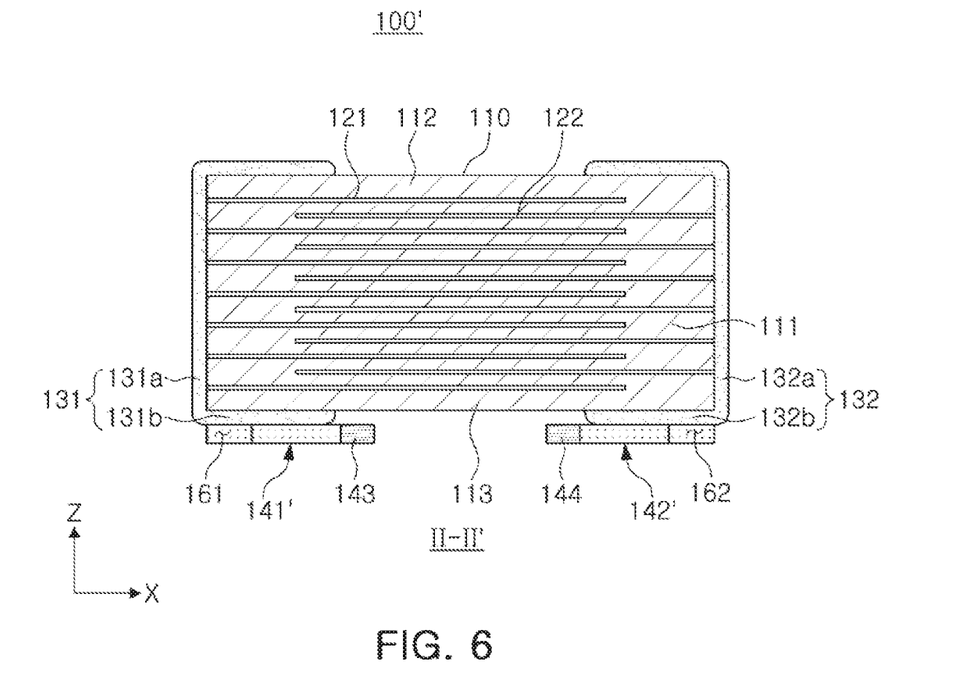
FIG. 6 is a cross-sectional view taken along line II-II' of FIG. 5.

FIG. 5 is a perspective view schematically illustrating an electronic component according to another exemplary embodiment in the present disclosure, and FIG. 6 is a cross-sectional view taken along line II-II' of FIG. 5.

Referring to FIGS. 5 and 6, first and second connection portions 141' and 142' according to another exemplary embodiment in the present disclosure may have at least one first and second cut portions 141a and 142a, respectively.

Therefore, first and second solder accommodating portions 161 and 162 may be provided on the first and second band portions 131b and 132b of the first and second external electrodes 131 and 132 toward the first surface, the mounting surface, of the capacitor body 110 by the first and second cut portions 141a and 142a.

In the present exemplary embodiment, the first and second cut portions 141a and 142a may be formed on surfaces of the first and second connection portions 141' and 142' opposing each other in the X direction, respectively. Here, the first and second cut portions 141a and 142a may be formed to be curved.

Further, in the first connection terminal 141', a first conductive pattern may be formed on an entire surface of the first connection terminal 141' connecting the first and second land patterns 1410a and 1410b to each other or formed on a portion of the surface thereof, including the first cut portion 141a, and in the second connection terminal 142', the second conductive pattern may be formed on the entire surface connecting the third and fourth land patterns 1420a and 1420b to each other or formed on a portion of the surface, including the second cut portion 142a.

More specifically, the first connection terminal 141' according to the present exemplary embodiment may include a first land pattern 1410a formed on a surface of the first connection terminal 141' facing the first external electrode 131, a second land pattern 1410b formed on a surface thereof opposing the first land pattern 1410a, the first cut portion 141a formed on a portion of the surface thereof connecting the first and second land patterns 1410a and 1410b to each other, and a first conductive pattern 1410c formed on the first cut portion 141a and electrically connecting the first and second land patterns to each other.

Further, the second connection terminal 142' may include a third land pattern 1420a formed on a surface of the second connection terminal 142' facing the second external electrode 132, a fourth land pattern 1420b formed on a surface thereof opposing the third land pattern 1420a, the second cut portion 142a formed on a portion of the surface thereof connecting the third and fourth land patterns 1420a and 1420b to each other, and a second conductive pattern 1420c formed on the second cut portion 142a and electrically connecting the third and fourth land patterns 1420a and 1420b to each other.

That is, the first and second cut portions 141a and 142a may serve as solder pockets trapping molten solder, or the like, used at the time of mounting the electronic component according to the present exemplary embodiment on a board, or the like, and prevent the solder from being formed toward the upper surface of the capacitor body 110 to suppress vibrations of the capacitor body 110 from being transferred to the board. Therefore, acoustic noise may be decreased.

Figure 7:
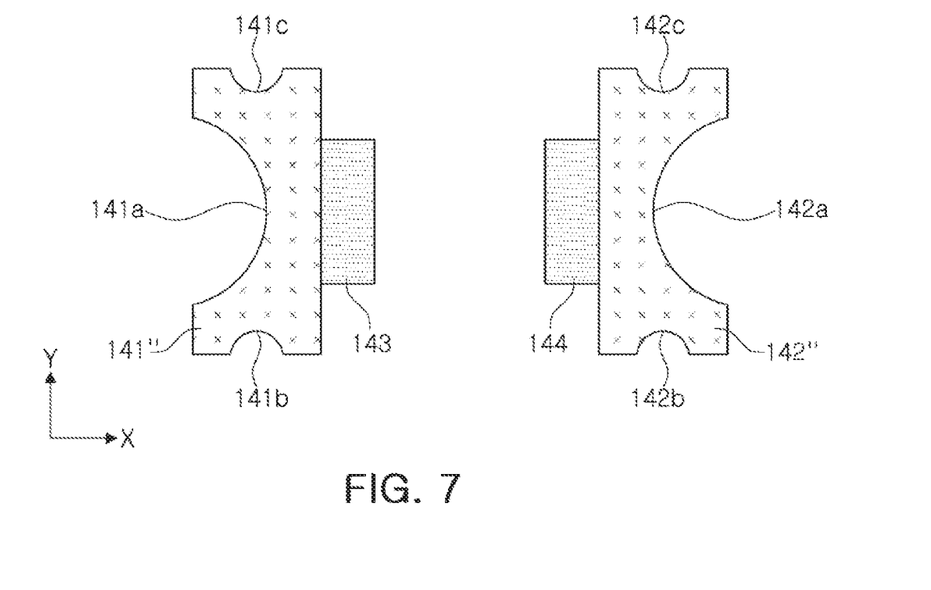
FIG. 7 is a plan view illustrating another example of a connection terminal according to the present disclosure.

FIG. 7 is a plan view illustrating another example of a connection terminal according to the present disclosure.

Referring to FIG. 7, in first and second connection terminals 141" and 142" according to another exemplary embodiment in the present disclosure, cut portions 141b, 141c, 142b, and 142c may be further formed in both surfaces of the capacitor body 110 in the Y direction corresponding to the width direction.

Therefore, an adhesion area between connection terminals and external electrodes may be decreased as compared to the above-mentioned exemplary embodiment, but areas of solder accommodating portions may be further increased, such that formation of a solder fillet may be further suppressed at the time of mounting the electronic component on a board. Therefore, acoustic noise may be further decreased.

Figure 8:
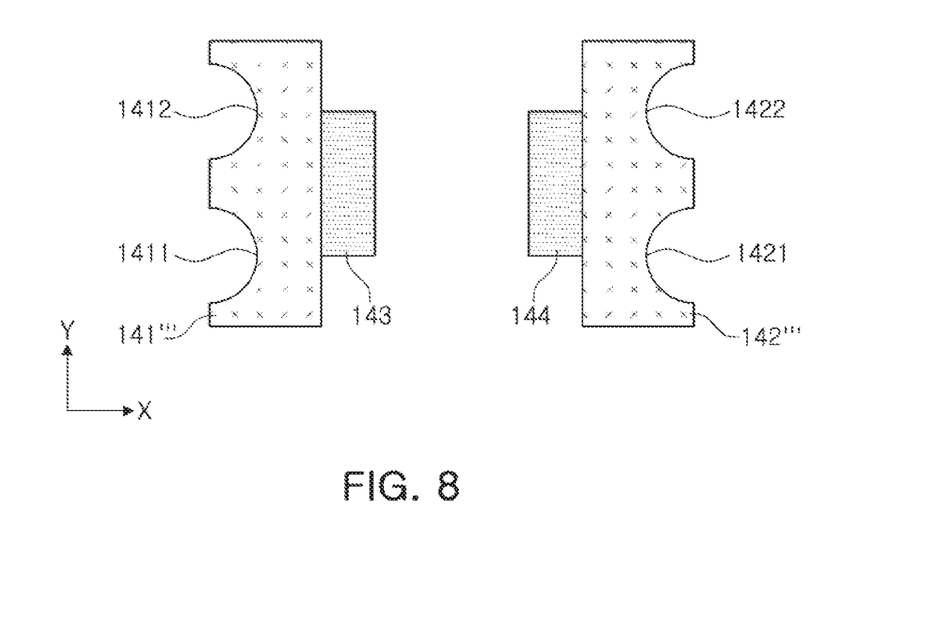
FIG. 8 is a plan view illustrating another example of a connection terminal according to the present disclosure.

FIG. 8 is a plan view illustrating another example of a connection terminal according to the present disclosure.

Referring to FIG. 8, in first and second connection terminals 141''' and 142''' according to another exemplary embodiment in the present disclosure, a plurality of cut portions 1411, 1412, 1421, and 1422 may be formed in both surfaces of the capacitor body 110 in the X direction corresponding to the length direction.

Therefore, since formation of solder fillets at the time of mounting the electronic component on a board may be further suppressed by increasing an area of solder accommodating portions, acoustic noise may be further decreased.

Although a case in which two cut portions are formed in one surface of each of the connection terminals in the length direction is illustrated and described in FIG. 8, the cut portions are not limited thereto, and the number of cut portion may be changed depending on the purpose.

When voltages having different polarities are applied to the first and second external electrodes 131 and 132 formed on the electronic component in a state in which the electronic component 100 is mounted on a board, the capacitor body 110 may be expanded and contracted in the Z direction due to an inverse piezoelectric effect of the dielectric layers 111, and both end portions of the first and second external electrodes 131 and 132 may be contracted and expanded as opposed to the expansion and the contraction of the capacitor body 110 in the Z direction due to a Poisson effect.

This contraction and expansion may generate vibrations. In addition, the vibrations may be transferred from the first and second external electrodes 131 and 132 to the board. Therefore, sound may be radiated from the board, which becomes the acoustic noise.

Here, solder formed between the first and second external electrodes 131 and 132 of the electronic component and first and second pads formed on one surface of the board may be formed toward the second surface 2 of the capacitor body 110 to have a predetermined height, such that the vibrations generated from the electronic component 100 may be significantly transferred to the board.

However, in the present exemplary embodiment, piezoelectric vibrations transferred to the board through the first and second external electrodes 131 and 132 of the electronic component may be absorbed due to elasticity of the first and second connection terminals 141 and 142, such that acoustic noise may be decreased.

Further, first and second solder accommodating portions provided by the first and second cut portions 141a and 142a of the first and second connection terminals 141 and 142, respectively, may serve as the solder pockets that may trap the solder on the first surface of the capacitor body 110.

Therefore, a piezoelectric vibration transfer path of the electronic component 100 may be blocked, and the solder fillets and a maximum displacement point in the capacitor body 110 may be spaced apart from each other, such that an acoustic noise decreasing effect may be significantly improved as compared to an electronic component according to the related art.

According to the present exemplary embodiment, a vibration amount of the piezoelectric vibrations of the multilayer electronic component transferred to the board at an audio frequency within 20 kHz of the multilayer electronic component may be effectively suppressed by an acoustic noise decreasing structure described above.

Therefore, high frequency vibrations of the multilayer electronic component may be decreased to prevent malfunctions of sensors that may be caused by high frequency vibrations of 20 kHz or more of the electronic component in information technology (IT) or industry/electrical component fields, and accumulation of internal fatigue of the sensors due to vibrations for a long period of time may be suppressed.

As set forth above, according to exemplary embodiments in the present disclosure, there is an effect of decreasing acoustic noise of the multilayer electronic component in an audio frequency region of 20 kHz or less and a high-frequency vibration of 20 kHz or more.

While exemplary embodiments have been shown and described above, it will be apparent to those skilled in the art that modifications and variations could be made without departing from the scope of the present invention as defined by the appended claims.

What is claimed is:

1. An electronic component comprising:
   a capacitor body;
   first and second external electrodes disposed on a mounting surface of the capacitor body to be spaced apart from each other; and
   first and second connection terminals including an insulator, and electrically connected to the first and second external electrodes, respectively, through land patterns disposed on upper and lower surfaces thereof and electrically connected to each other, and having first and second bridge portions protruding so as to face each other in the length direction of the capacitor body, respectively.

2. The electronic component of claim 1, wherein the first connection terminal includes a first land pattern disposed on a surface of the first connection terminal facing the first external electrode, a second land pattern disposed on a surface thereof opposing the first land pattern, and a first conductive pattern disposed on at least a portion of a surface thereof connecting the first and second land patterns to each other and electrically connecting the first and second land patterns to each other, and
   the second connection terminal includes a third land pattern disposed on a surface of the second connection terminal facing the second external electrode, a fourth land pattern disposed on a surface thereof opposing the third land pattern, and a second conductive pattern disposed on at least a portion of a surface thereof connecting the third and fourth land patterns to each other and electrically connecting the third and fourth land patterns to each other.

3. The electronic component of claim 1, wherein at least one cut portion is formed in surfaces of the first and second connection terminals opposing each other in the length direction of the capacitor body, respectively.

4. The electronic component of claim 3, further comprising an additional cut portion formed in a surface of the first and second connection terminals in the width direction of the capacitor body.

5. The electronic component of claim 3, wherein a solder accommodating portion is provided on at least one selected from the group of the first and second external electrodes.

6. The electronic component of claim 3, wherein the cut portion includes a first cut portion disposed in a surface of the first connection terminal, and a second cut portion disposed in a surface of the second connection terminal,
   the first connection terminal includes a first land pattern disposed on a surface of the first connection terminal facing the first external electrode, a second land pattern disposed on a surface thereof opposing the first land pattern, the first cut portion disposed on a portion of the surface thereof connecting the first and second land patterns to each other, and a first conductive pattern disposed on the first cut portion and electrically connecting the first and second land patterns to each other, and
   the second connection terminal includes a third land pattern disposed on a surface of the second connection terminal facing the second external electrode, a fourth land pattern disposed on a surface thereof opposing the third land pattern, the second cut portion disposed on a portion of the surface thereof connecting the third and fourth land patterns to each other, and a second conductive pattern disposed on the second cut portion and electrically connecting the third and fourth land patterns to each other.

7. The electronic component of claim 6, wherein the first conductive pattern covers an entire surface of the first connection terminal connecting the first and second land patterns to each other or a portion of the surface including the first cut portion, and
   the second conductive pattern covers an entire surface of the second connection terminal connecting the third and fourth land patterns to each other or a portion of the surface including the second cut portion.

8. The electronic component of claim 1, further comprising plating layers disposed on surfaces of the first and second external electrodes.

9. The electronic component of claim 1, wherein the capacitor body includes a plurality of dielectric layers and a plurality of first and second internal electrodes alternately disposed with respective dielectric layers interposed therebetween and has first and second surfaces opposing each other and third and fourth surfaces connected to the first and second surfaces and opposing each other, and one ends of the first and second internal electrodes are exposed to the third and fourth surfaces of the capacitor body, respectively.

10. The electronic component of claim 9, wherein the first and second external electrodes respectively include:
    first and second connection portions disposed on the third and fourth surfaces of the capacitor body, respectively, and
    first and second band portions extended from the first and second connection portions to portions of the first surface of the capacitor body and connected to the first and second connection terminals, respectively.

11. The electronic component of claim 3, wherein the solder accommodating portion is disposed toward the mounting surface of the capacitor body by the cut portion.

12. The electronic component of claim 3, wherein a plurality of cut portions are formed in each of the surfaces of the first and second connection terminals opposing each other in the length direction of the capacitor body, respectively.

13. The electronic component of claim 1, wherein the bridge portions include at least one selected from the group of FR-4, F-PCB and a ceramic material.

* * * * *